(12) United States Patent
Wells

(10) Patent No.: US 11,038,405 B2
(45) Date of Patent: Jun. 15, 2021

(54) ELECTRIC MACHINE

(71) Applicant: Dyson Technology Limited, Wiltshire (GB)

(72) Inventor: Alexander Thomas Wells, Gloucester (GB)

(73) Assignee: Dyson Technology Limited, Wiltshire (GB)

( * ) Notice: Subject to any disclaimer, the term of this patent is extended or adjusted under 35 U.S.C. 154(b) by 121 days.

(21) Appl. No.: 16/157,523

(22) Filed: Oct. 11, 2018

(65) Prior Publication Data

US 2019/0115807 A1    Apr. 18, 2019

(30) Foreign Application Priority Data

Oct. 12, 2017  (GB) ...................... 1716693

(51) Int. Cl.
| | |
|---|---|
| *H02K 29/08* | (2006.01) |
| *H02K 11/215* | (2016.01) |
| *H02K 5/173* | (2006.01) |
| *H02K 1/27* | (2006.01) |
| *H02K 5/16* | (2006.01) |
| *H02K 7/00* | (2006.01) |

(52) U.S. Cl.
CPC ............ *H02K 11/215* (2016.01); *H02K 1/27* (2013.01); *H02K 5/161* (2013.01); *H02K 5/1732* (2013.01); *H02K 7/003* (2013.01); *H02K 2211/03* (2013.01); *H02K 2213/03* (2013.01)

(58) Field of Classification Search
CPC ........ H02K 5/16–5/1737; H02K 11/21–11/23; H02K 29/06–29/24
See application file for complete search history.

(56) References Cited

U.S. PATENT DOCUMENTS

| | | | |
|---|---|---|---|
| 2,089,601 A | 8/1937 | Ernst | |
| 3,866,263 A | 2/1975 | Crouser et al. | |
| 4,533,370 A | 8/1985 | Ikezaki | |
| 5,552,988 A | 9/1996 | Kawaguchi et al. | |
| 5,592,716 A | 1/1997 | Moren et al. | |
| 5,939,807 A | 8/1999 | Patyk et al. | |
| 8,004,135 B2* | 8/2011 | Peterson ............... | H02K 11/33 310/89 |

(Continued)

FOREIGN PATENT DOCUMENTS

| | | |
|---|---|---|
| DE | 641371 | 1/1937 |
| DE | 7514249 | 4/1976 |

(Continued)

OTHER PUBLICATIONS

Notification of Reason for Rejection dated Aug. 26, 2019, directed to JP Application No. 2018-191803; 3 pages.

(Continued)

*Primary Examiner* — Ramon M Barrera
(74) *Attorney, Agent, or Firm* — Morrison & Foerster LLP

(57) ABSTRACT

An electric machine comprising: a frame; and a rotor assembly comprising a shaft to which is mounted at least one bearing and at least one magnet; the frame comprising a bearing seat to which the bearing of the rotor assembly is mounted, and wherein the bearing seat extends axially beyond the bearing to surround the magnet, and the bearing seat comprises locating features for holding a position sensor assembly relative to the magnet.

12 Claims, 3 Drawing Sheets

(56) References Cited

U.S. PATENT DOCUMENTS

| | | |
|---|---|---|
| 2009/0026859 A1 | 1/2009 | Kinoshita et al. |
| 2009/0261693 A1 | 10/2009 | Debraillly et al. |
| 2012/0027329 A1 | 2/2012 | Landrieve |
| 2017/0201150 A1 | 7/2017 | Haga et al. |
| 2017/0279328 A1 | 9/2017 | Albee et al. |

FOREIGN PATENT DOCUMENTS

| | | |
|---|---|---|
| DE | 7931329 | 5/1980 |
| DE | 4100858 | 7/1992 |
| DE | 19616156 | 10/1997 |
| DE | 102008040318 | 1/2010 |
| DE | 102013220495 | 4/2015 |
| EP | 0461443 | 12/1991 |
| JP | 54-181659 | 12/1979 |
| JP | 54-181660 | 12/1979 |
| JP | S61-62353 A | 3/1986 |
| JP | 1-99343 | 7/1989 |
| JP | 1-149753 | 10/1989 |
| JP | 3-88448 | 9/1991 |
| JP | 3-114153 | 11/1991 |
| JP | 4-361722 | 12/1992 |
| JP | 4-364823 | 12/1992 |
| JP | 2006-94573 A | 4/2006 |
| JP | 2009-36235 A | 2/2009 |
| WO | 98/37618 | 8/1998 |
| WO | 2010/116205 | 10/2010 |

OTHER PUBLICATIONS

International Search Report and Written Opinion dated Nov. 7, 2018, directed to International Application No. PCT/GB2018/052561; 11 pages.

Search Report dated Mar. 16, 2018, directed to GB Application No. 1716693.5; 2 pages.

Decision on Rejection dated Jul. 13, 2020, directed to JP Application No. 2018-191803; 4 pages.

\* cited by examiner

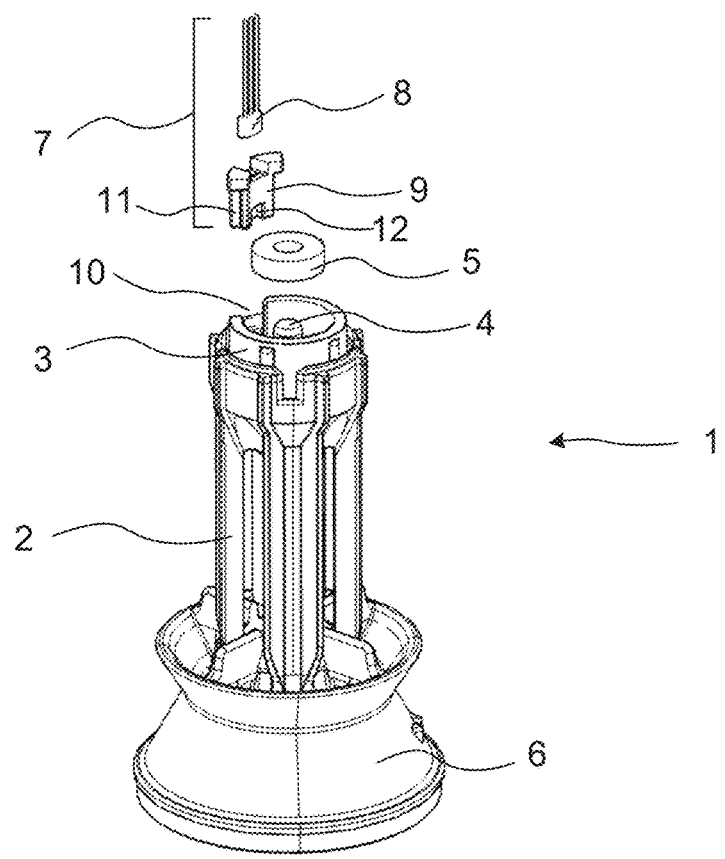
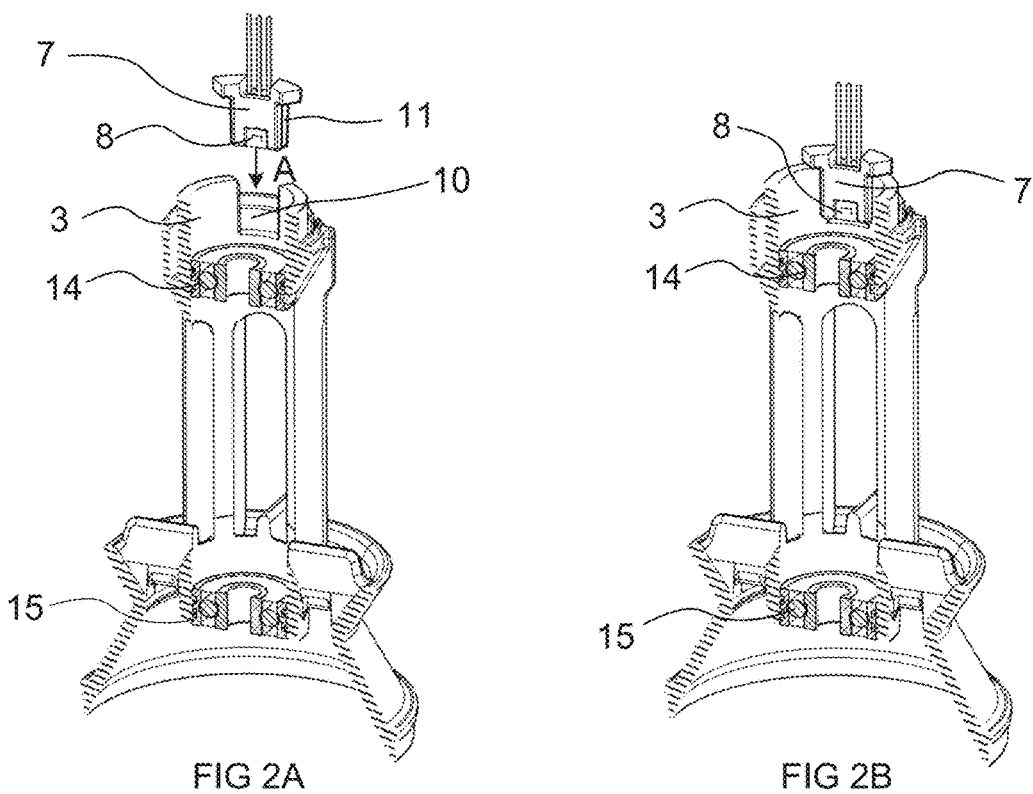
FIG 1
FIG 2A  FIG 2B

ELECTRIC MACHINE

REFERENCE TO RELATED APPLICATIONS

This application claims the priority of United Kingdom Application No. 1716693.5, filed Oct. 12, 2017, the entire contents of which are incorporated herein by reference.

FIELD OF THE INVENTION

The present invention relates to an electric machine.

BACKGROUND OF THE INVENTION

The output power of an electric machine is critically dependent on accurate synchronisation of phase energisation and rotor position. Accordingly, in electric machines such as high speed motors, it is important to have an accurate measurement of the angular position of the motor.

For many motors, the tolerance in the position of the sensor is not a problem. This may be because the size of the electric machine is relatively large and thus the tolerance in the position of the sensor is small in comparison to the circumference of the rotor. Consequently, any positional tolerance in the sensor results in a negligible offset in the electrical angle of the zero-crossings. Alternatively, the output power and/or the efficiency of the electric machine are not critical and thus the power losses that arise from the positional tolerance of the sensor are deemed acceptable. However, for electric machines that are relatively small and/or where relatively high efficiency is required, tolerances in the position of the sensor present a significant problem.

SUMMARY OF THE INVENTION

This invention provides an electric machine comprising: a frame; and a rotor assembly comprising a shaft to which is mounted at least one bearing and at least one magnet; the frame comprising a bearing seat to which the bearing of the rotor assembly is mounted, and wherein the bearing seat extends axially beyond the bearing to surround the magnet, and the bearing seat comprises locating features for holding a position sensor assembly relative to the magnet.

As a result, the magnet is protected by the bearing seat. Furthermore, because the bearing seat provides a mounting point for the rotor assembly as well as a mounting point for the position sensor assembly, tight control over the relative positioning can more easily be achieved. This in turn, provides a more accurate position measurement to the control system of the electric machine which can improve the machine's performance.

The position sensor may comprise a position sensor and a position sensor holder. The position sensor holder may comprise a pocket for holding the position sensor. Accordingly, a position sensor held within the pocket may be reliably positioned whilst also being protected by the holder.

The pocket may comprise a window, and the position sensor is positioned within the pocket such that an active face of the position sensor is directly exposed to the magnet. Accordingly, the sensor can be positioned closer to the magnet such that a stronger signal can be generated by the sensor to reflect the angular position of the magnet.

The position sensor may be a Hall-effect sensor. Accordingly, a relatively cheap solution is provided for accurately sensing the angular position of the magnet, and therefore the rotor assembly.

An outer diameter of the magnet may be smaller than an inner diameter of the bearing seat so as to define an annular air gap there between. Accordingly the magnet is able to freely rotate within the bearing seat. The distance between the magnet and the bearing seat may be between 0.5 mm and 2.5 mm.

The position sensor assembly may project into the annular air gap such that the distance between the magnet and the position sensor assembly is smaller than the gap between the magnet and the bearing seat. Accordingly, the position sensor assembly is positioned close to the magnet, and a stronger sensor output can be achieved, providing a more definite reading for the angular position of the rotor assembly. The distance between the magnet and the position sensor assembly may be between 0.1 mm and 1.0 mm.

The position sensor assembly may be mounted to a printed circuit board which is mounted to an outer can, or outer casing, of the electric machine. Accordingly, the sensor is able to provide a signal directly to components on the circuit board such as the processor for controlling the electric machine, allowing for a more accurate reading for the angular position of the rotor assembly. Furthermore, the printed circuit board may be fixed to the outer can of the motor, reducing any movement of the printed circuit board relative to the motor, and in turn reducing the likelihood of the position sensor assembly sensor being damaged as a consequence of any such relative movement.

The outer can may be mounted to the frame. As a result, this goes even further to reduce the likelihood of any relative movement damaging the position sensor assembly.

An outer surface of the bearing seat may provide a mounting point for the outer can. Accordingly, the outer can is fixed to the same part of the frame as the hall sensor holder, further reducing the likelihood of any relative movement between the position sensor assembly, the printed circuit board, the frame and the outer can. This further reduces the likelihood of any damage to the position sensor assembly.

A wall of the bearing seat may comprise a cut-out portion extending from an end of the bearing seat, and edges of the cut-out portion may form the locating features. Accordingly, the position sensor assembly can be mounted within the bearing seat and the impact on available space within the motor taken up by the position sensor holder can be reduced.

The position sensor assembly may comprise axially extending grooves configured to receive the edges of the cut out portion. As a result, the position sensor can be assembled into the bearing seat by sliding the edges of the cut out portion along the grooves, which serves to achieve the desired relative positioning between the bearing seat and the position sensor assembly without requiring any additional components.

The position sensor assembly may be configured to slot into the cut-out portion such that the position sensor assembly forms part of the wall of the bearing seat. As a result, additional space is not required to house the position sensor assembly within the housing, and the overall size of the motor can be reduced.

The magnet may be a sensor magnet and the electric machine may comprise a second magnet fixed to the shaft, the second magnet being a permanent magnet for the rotor core of the electric machine. As a result, the position sensor assembly is not required to be positioned close to the permanent magnet, allowing for a greater degree of freedom in the relative position of the rotor and stator assemblies.

This can help achieve an electric machine having a smaller diameter, and also can improve the performance of the electric machine.

The sensor magnet and the second magnet may be fixed to the shaft on either side of the bearing. As a result, a better balancing of the components on the shaft can be achieved, and the life of the bearing can be improved.

BRIEF DESCRIPTION OF THE DRAWINGS

In order that the present invention may be more readily understood, embodiments of the invention will now be described, by way of example, with reference to the following accompanying drawings, in which:

FIG. 1 shows a partly exploded perspective view of part of a compressor;

FIGS. 2A and 2B show a cross section through the part of a compressor of FIG. 1 during an assembly stage;

DETAILED DESCRIPTION OF THE INVENTION

Figure 3:
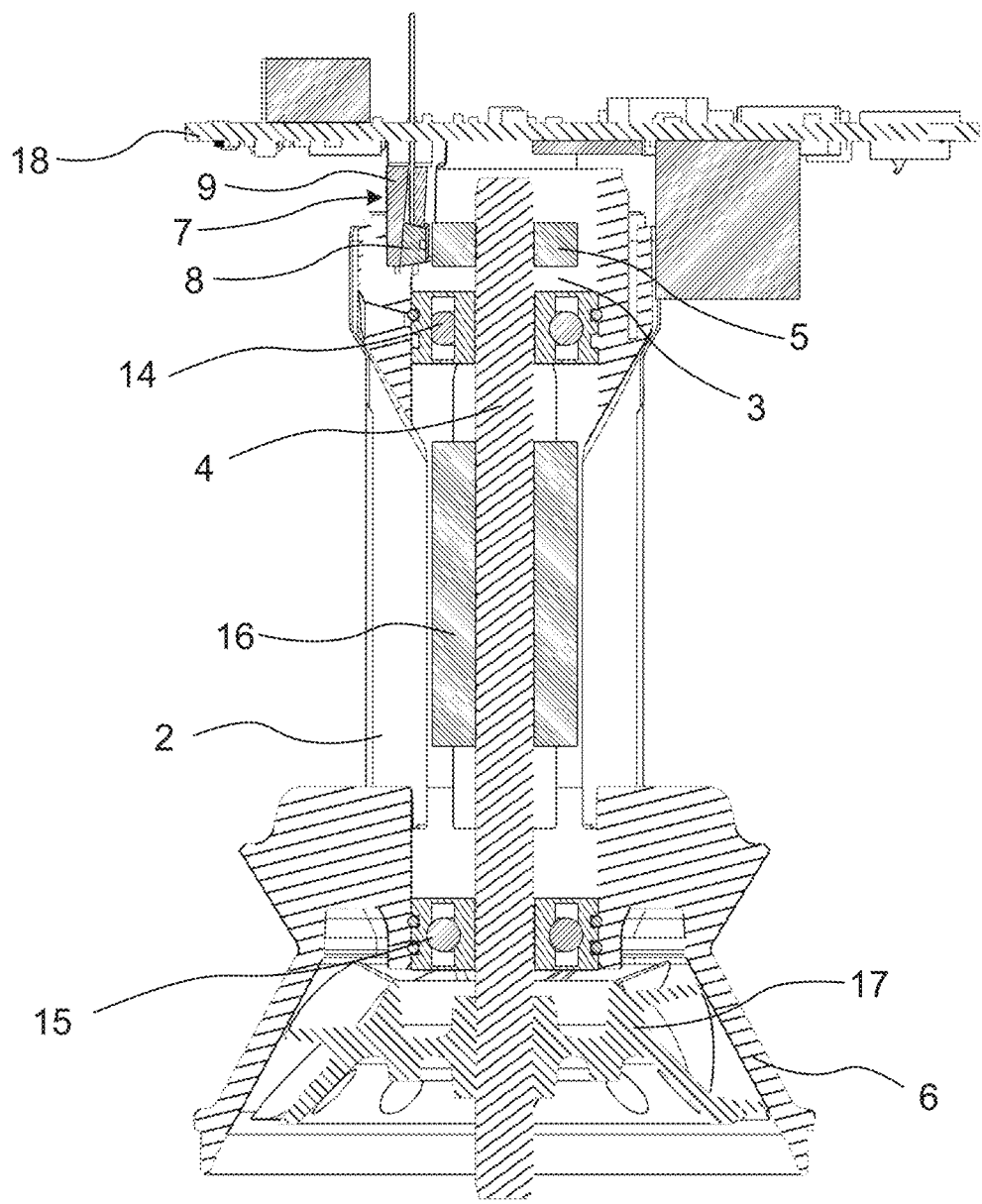
FIG. 3 shows a cross section through part of a compressor.

The term "axially" is used herein to describe a direction parallel to the rotational axis of the shaft of the electric machine, and could alternatively be referred to as "longitudinally".

FIG. 1 shows a partly exploded perspective view of part of an electric machine in the form of a compressor 1. Certain components, such as control electronics and a stator assembly, are not shown for clarity. The compressor 1 comprises a frame 2, to which the stator assembly and rotor assembly of the motor can be mounted. Other components, not shown, can also be mounted to the frame, for example an outer casing, or a diffuser.

Part of a rotor assembly can be seen in FIG. 1. The rotor assembly comprises a shaft 4 on which, when assembled, is mounted a magnet 5. The magnet 5 in the embodiment of FIG. 1 is a sensor magnet. The rotor assembly comprises other components not visible in FIG. 1, including a rotor core permanent magnet, first and second balancing rings, and first and second bearings. The bearings are mounted on the shaft 4 on either side of the rotor core permanent magnet, and are fixed to the frame 2 at bearing seats which will be shown more clearly in later figures and described in more detail below. As the electric machine is a compressor in this embodiment, an impeller is mounted at one end of the shaft 4. The impeller is housed within the shroud portion 6 of the frame 2.

A position sensor assembly 7 comprising a position sensor in the form of a Hall sensor 8 and a position sensor holder 9 (used interchangeably herein with the term Hall sensor holder) is fixed to the frame 2 at the bearing seat 3 such that, when assembled, the Hall sensor 8 is adjacent the sensor magnet 5 which is surrounded by the bearing seat 3. The wall of the bearing seat 3 has a cut-out portion 10, and the position sensor holder 9 slots into the cut-out portion 10 of the bearing seat 3. The position sensor holder 9 has grooves 11 into which the edges of the cut-out portion 10 can be received. The edges of the cut-out portion therefore act as locating features to hold the position sensor assembly 7 in place.

The position sensor holder 9 comprises a window 12. When the Hall sensor 8 is assembled into the position sensor holder 9, the Hall sensor 8 is held within a pocket in the position sensor holder 9 and an active face of the Hall sensor 8 is exposed to the sensor magnet 5 through the window 12.

FIGS. 2A and 2B show the position sensor assembly 7 being slotted into place within the cut-out portion 10 of the bearing seat 3. The bearings 14 and 15 are shown in FIGS. 2A and 2B, but the other components of the rotor assembly have been hidden for clarity. The cross-section shows how the bearing seat 3 extends axially beyond the bearing 14, and defines a cavity in which the magnet 5 can be positioned such that the bearing seat 3 surrounds the magnet 5.

The edges of the cut-out portion 10 engage with the grooves provided in the position sensor holder, and the position sensor slide into place along an axial direction as indicated by arrow A in FIG. 2A. As shown in FIG. 2B, when assembled in place the position sensor assembly 7 forms part of the wall of the bearing seat 3. By incorporating the position sensor assembly 7 into the wall of the bearing seat 3, the outer diameter of the bearing seat can be minimised, as it is not necessary to fit the position sensor inside the inner diameter of the bearing seat with the sensor magnet.

FIG. 3 shows a cross section through part of a compressor 1. More components of the compressor 1 are shown in FIG. 3 than in previous figures. The rotor assembly comprises the shaft 4 to which are attached a rotor core permanent magnet 16, a sensor magnet 5, an impeller 17 and first and second bearings 14, 15 mounted to the shaft 4 either side of the permanent magnet 16. The impeller 17 is positioned inside the shroud portion 6 of the frame 2. One or more balancing rings, not shown, may also be fixed to the shaft, preferably on either side of the permanent magnet 16.

A stator assembly comprising a number of stator cores and windings are not shown for clarity. However these would be fixed in elongate slots formed in the frame 2 proximate the rotor core permanent magnet 16.

The sensor magnet 5 is mounted to the shaft 4 such that the sensor magnet 5 and the permanent magnet 16 are mounted either side of the bearing 14. This allows the position sensor assembly 7 to be positioned within the motor away from where the stator assembly components such as the stator cores are positioned. This allows the stator cores to be packed in more closely towards the rotor core permanent magnet 16, and a compressor having a smaller diameter, as well as improved performance, can be achieved.

The position sensor assembly 7 will typically be fixed to a printed circuit board (PCB), as shown in the embodiment of FIG. 3, such that the signal from the Hall sensor can be provided directly to the controller and other components on the PCB that control the compressor 1. The printed circuit board (PCB) 18 is mounted to an end of the compressor 1 at the opposite end to the impeller 17. The PCB 18 may not be directly mounted to the frame 2, but may be mounted to an outer can (not shown in the figures) which in turn is mounted to the frame 2. The outer can is sometimes referred to as a motor casing or an outer frame.

Figure 4:
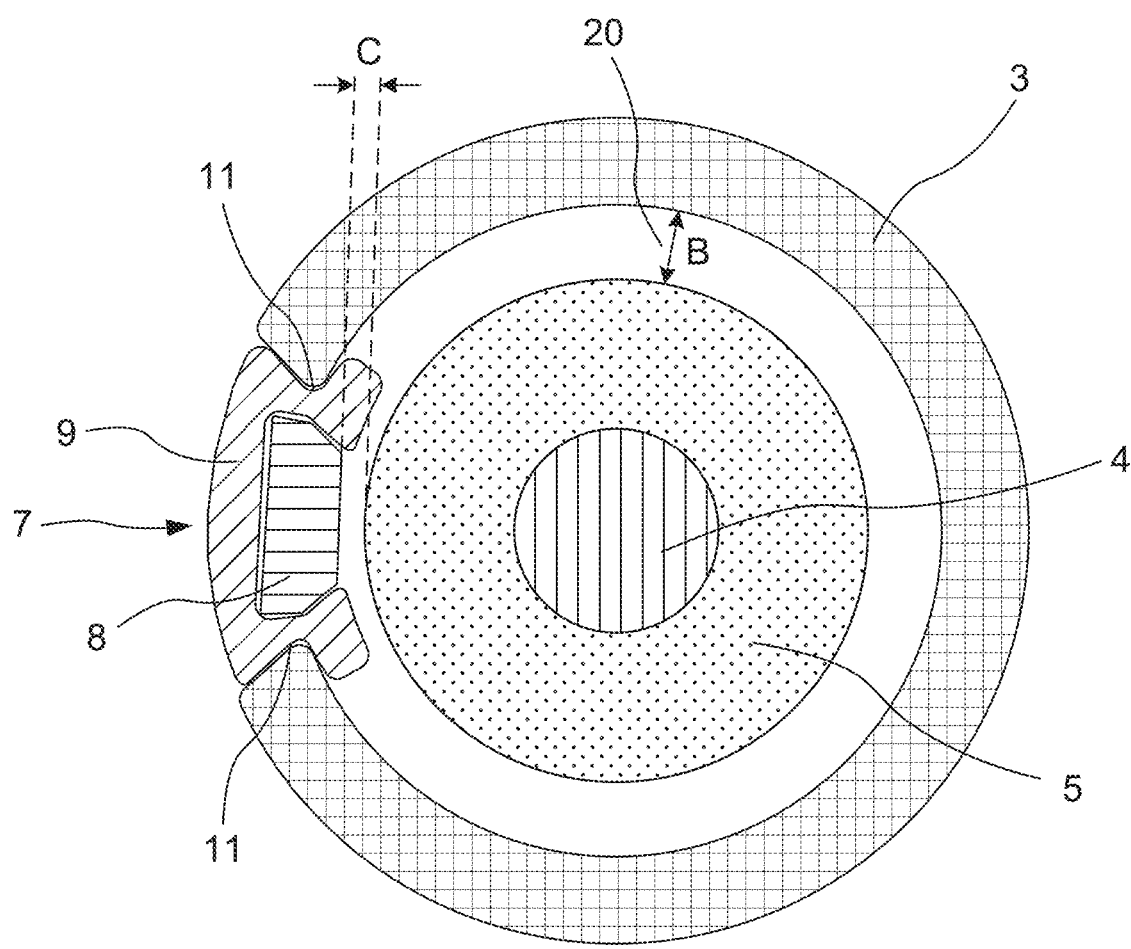
FIG. 4 shows a cross section through a bearing seat portion of the compressor of the previous Figures.

FIG. 4 shows a cross section through the bearing seat 3 part of the frame 2 of the compressor 1. The cross section of FIG. 4 is orthogonal to the direction of the axial cross section shown in FIGS. 2A, 2B and 3. The cross section is taken such that the cross section passes through the part of the bearing seat 3 having the cut-out portion 10, the position sensor holder 9, the Hall sensor 8, as well as the shaft 4 and sensor magnet 5. The cross section also passes through the window 12 in the position sensor holder 8 such that it can be seen that the active face of the Hall sensor 8 is directly exposed to the sensor magnet 5. As a result of the window 12, the distance between the Hall sensor 8 and the sensor magnet 5 can be reduced because no part of the position sensor holder 9 comes between the active face of the Hall sensor 8 and the sensor magnet 5.

The outer diameter of the sensor magnet 5 is smaller than the inner diameter of the bearing seat 3 such that there is an annular air gap 20 between the two. The shaft 4 and sensor magnet 5 are therefore able to freely rotate within the bearing seat 3. The thickness of the annular air gap 20, as defined by the distance between the magnet 5 and the bearing seat 3, as represented by distance B in FIG. 4, is between 0.5 mm and 2.5 mm for the compressor shown in the Figures.

The edges of the cut out portion of the bearing seat 3 are received within the grooves 11 in the position sensor holder 8. This allows for tight control over the relative positioning between the Hall sensor 8 and the sensor magnet 5. The position sensor assembly 7 comprising the Hall sensor 8 and Hall sensor holder 9 fills the cut-out portion of the bearing seat 3 such that the position sensor assembly 7 forms part of the wall of the bearing seat 3.

The position sensor assembly 7 projects into the annular air gap 20 such that the distance between the sensor magnet 5 and the position sensor assembly 7 is smaller than the distance between the sensor magnet 5 and the bearing seat 3. In particular, the distance between the sensor magnet 5 and the Hall sensor 8, as represented by the distance C in FIG. 4, is smaller than distance B. Distance C is between 0.1 mm and 1.0 mm for the compressor shown in the Figures. By positioning the Hall sensor 8 closer to the sensor magnet 5, a stronger signal and sensor output can be provided by the Hall sensor 8. This will allow a more definite and precise position reading to be provided to the motor controller.

Whilst particular embodiments have thus far been described, it will be understood that various modifications may be made without departing from the scope of the invention as defined by the claims. For example, embodiments shown and described herein show an electric machine having a separate sensor magnet. However, the position sensor assembly and the rotor core could be positioned such that the hall sensor senses the position of the rotor core permanent magnet instead of a separate sensor magnet. In this instance, the permanent magnet could, for example, extend inside the bearing seat such that a portion of the magnet is aligned axially with the position sensor.

Furthermore, in another embodiment the position sensor assembly may not be mounted to the PCB, and may be positioned remote from the PCB. This may allow more freedom with the layout and positioning of the PCB relative to the other components of the electric machine. The signal from the position sensor could then be relayed to the PCB through a signal wire, or other cable. In addition, instead of the position sensor assembly slotting inside a cut-out portion of the bearing seat, the position sensor assembly may be overmoulded to locating features on the bearing seat.

As a further example, the embodiments shown and described herein are directed to a compressor with an impeller. However, the invention would be beneficial to other types of electric machine such as brushless electric motors used to drive a load other than an impeller.

The invention claimed is:

1. An electric machine comprising:
   a frame; and
   a rotor assembly comprising a shaft to which is mounted at least one bearing and at least one magnet;
   the frame comprising a bearing seat to which the bearing of the rotor assembly is mounted, wherein the bearing seat extends axially beyond the bearing to surround the magnet, and the bearing seat comprises locating features for holding a position sensor assembly relative to the magnet, and wherein a wall of the bearing seat comprises a cut-out portion extending axially from an end of the bearing seat, and edges of the cut-out portion form the locating features, and wherein the position sensor assembly comprises axially extending grooves configured to receive the edges of the cut out portion.

2. The electric machine of claim 1, wherein the position sensor comprises a position sensor and a position sensor holder.

3. The electric machine of claim 2, wherein the position sensor holder comprises a pocket for holding the position sensor.

4. The electric machine of claim 3, wherein the pocket comprises a window, and the position sensor is positioned within the pocket such that an active face of the position sensor is directly exposed to the magnet.

5. The electric machine of claim 2, wherein the position sensor is a Hall-effect sensor.

6. The electric machine of claim 1, wherein an outer diameter of the magnet is smaller than an inner diameter of the bearing seat so as to define an annular air gap there between.

7. The electric machine of claim 6, wherein the distance between the magnet and the bearing seat is between 0.5 mm and 2.5 mm.

8. The electric machine of claim 6, wherein the position sensor assembly projects into the annular air gap such that the distance between the magnet and the position sensor assembly is smaller than the gap between the magnet and the bearing seat.

9. The electric machine of claim 8, wherein the distance between the magnet and the position sensor assembly is between 0.1 mm and 1.0 mm.

10. The electric machine of claim 1, wherein the position sensor assembly is configured to slot into the cut-out portion such that the position sensor assembly forms part of the wall of the bearing seat.

11. The electric machine of claim 1, wherein the magnet is a sensor magnet and the electric machine comprises a second magnet fixed to the shaft, the second magnet being a permanent magnet for the rotor core of the electric machine.

12. The electric machine of claim 11, wherein the sensor magnet and the second magnet are fixed to the shaft on either side of the bearing.

* * * * *